United States Patent [19]
Hohjo et al.

[11] Patent Number: 5,156,935
[45] Date of Patent: Oct. 20, 1992

[54] LEAD-ACID BATTERY

[75] Inventors: Eiji Hohjo; Kenjiro Kishimoto; Yoshio Kasai; Hiroto Nakashima; Osamu Matsushita, all of Takatsuki, Japan

[73] Assignee: Yuasa Battery Co., Ltd., Osaka, Japan

[21] Appl. No.: 373,371

[22] Filed: Jun. 28, 1989

[30] Foreign Application Priority Data

| Jul. 21, 1988 | [JP] | Japan | 63-182670 |
| Jul. 27, 1988 | [JP] | Japan | 63-189339 |
| Aug. 4, 1988 | [JP] | Japan | 63-195438 |
| Aug. 8, 1988 | [JP] | Japan | 63-198539 |

[51] Int. Cl.$^5$ .............................. H01M 4/62
[52] U.S. Cl. ............................. 429/225; 429/232
[58] Field of Search ......................... 429/225, 232

[56] References Cited

U.S. PATENT DOCUMENTS

| 1,304,192 | 5/1919 | Morrison | 429/225 |
| 2,234,732 | 3/1941 | Haunz | 429/226 |
| 3,466,193 | 9/1969 | Hoghel | 429/228 |

FOREIGN PATENT DOCUMENTS

0094770  6/1983  Japan .................. 429/225

Primary Examiner—Stephen Kalafut
Attorney, Agent, or Firm—Armstrong & Kubovcik

[57] ABSTRACT

A lead-acid battery using dilute sulfuric acid as the electrolyte, has a plate group composed of at least one positive plate, one negative plate and an intervening separator. Whiskers of at least one type selected from carbon, graphite and potassium titanate, having an electronic conductivity, with a diameter of 10 μm or less and an aspect ratio of 50 or more, and a specific surface area of 2 $m^2/g$ are mixed with at least one of the active materials of the positive and negative plates by 0.01 to 10 wt. % of the active material so as to connect the active material particles mutually and/or active material and current collector electronic conductively.

33 Claims, 6 Drawing Sheets x 5000

LEAD-ACID BATTERY

BACKGROUND OF THE INVENTION (1) Field of the Invention

The present invention relates to a lead-acid battery.

(2) Description of the Prior

The capacity of a lead-acid battery is, as known well, defined by the amounts of active materials in the negative and positive plates and sulfuric acid in the electrolyte.

In a lead-acid battery with a specific volume or a specific weight, in order to raise the active material utilization, it is necessary to decrease the active materials and increase the sulfuric acid volume, or to use sulfuric acid of high concentration. However, to raise the rate of utilization of the positive active material means to encourage softening and shedding of the active material, and also to accelerate grid corrosion. As a result, the cycle and the float life performance of the obtained battery are extremely shortened.

On the other hand, when the utilization of the negative active material is raised, the resistance of the active material to sulfation is lowered, and its life is shortened. When sulfuric acid of high concentration is used, the volume efficiency and weight efficiency of the battery can be raised. Nevertheless, since sulfuric acid of high concentration promotes the sulfation of the negative active material, it leads also to shortening of the battery life.

The plates used in the lead-acid battery may be roughly classified into the pasted type and the tubular type. Whichever plate might be used, it took an enormous amount of electric energy and time in the formation process to activate the unformed active material. Actually, the excess electric quantity in this formation process is necessary in order to activate the active material of the positive plate, in particular, and usually an electric quantity 2 to 4 times as much as required theoretically is consumed. This seems because the electron conductivity of lead dioxide which is the positive active material is low, and the electronic conductivity between active material particles is maintained only by the contact between particles. That is, when forming the positive plate, first the particles contacting with the current collector are oxidized to become lead dioxide. Next, the particles contacting the lead dioxide are formed, and this process is repeated to make up a formed plate. Therefore, particles far away from the current collector are formed finally in the final stage of the formation process. It means, within the formation process, that the density of the formation current in active material particles is high in the initial stage and low in the final stage, and on the whole the efficiency of the formation current is made much lower. For ease of formation, minium ($Pb_3O_4$) may be added to the unformed active material. In this method, only the required electric quantity is decreased because the oxidation is advanced. It is therefore the same that the formation is started from the vicinity of the current collector so that the entire efficiency of the electric quantity for formation is lowered. Besides, minium is expensive, and its demerit of high cost is greater than the merit of saving of energy consumption for formation.

It is proposed in the U.S. Pat. No. 4,631,241 to mix graphite in the positive active material, hold the electrolyte between the layers, of the graphite and increase the pore volume in the positive plate so as to increase the capacity. Since graphite possesses an electron conductivity, it is possible to connect the particles of the active material electron conductively. However, the graphite disclosed in this cited reference is large in particle size, that is, 340 $\mu$m, and the number is too few to connect among particles of the active material. The number of active material particles per unit volume is estimated around $1 \times 10^{12}$ to $1 \times 10^{16}$ in the case of positive plate, and $1 \times 10^9$ to $1 \times 10^{13}$ in the case of negative plate, from the specific surface area, pore size distribution and other data. By contrast, when graphite of this size of 340 $\mu$m is added by 1 wt.% into the active material, the number of graphite particles per unit volume is about 500 to 1,000 at most, and this number is too small to expect an electron conductive connection among particles of the active material.

To improve bonding among active material particles, or between active material particles and grid, it is proposed to contain carbon fibers or electron conductive fibers in the active material in the Japanese Laid-Open Patents 61-128466, 54-0574, and 58-57264. Also in the Japanese Laid-Open Patent 49-103135, use of whiskers such as carbon fibers and lead is proposed. The proposed carbon fibers are 10 to 1,000 $\mu$m in diameter as mentioned as "diameter 0.01 to 1.0 mm" in the Japanese Laid-Open Patent 54-105741, and since the diameter is large and surface area is small, according to the test by the present inventors, the number of contacts with the active material particles is small, and it is found impossible to open up the features of carbon to the maximum extent to enhance the conductivity dramatically.

In the Japanese Laid-Open Patent 49-103135, aside from such carbon fibers, use of "lead and other metal whisker" is shown. It is not mentioned, however, how to obtain this "lead or other metal whisker" and what characteristics, dimensions and form it possesses, and since an equivalent material cannot be obtained, its effect cannot be confirmed by the present inventors.

When the present inventors mixed lead fibers of 30 $\mu$m in diameter cut to 2 mm size obtained by resonant vibration method into the active material, the density of the active material was raised and the contact density appeared to be enhanced, but, actually, the rate of utilization of active material and the charge acceptability were not improved.

According to the Japanese Laid-Open Patent 61-45565, "conductive synthetic resin fibers of 1 to 10 $\mu$m in diameter" "obtained by mixing carbon powder or acid-proof metal powder into polyolefin or polyester synthetic resin" are mixed into the active material. However, the conductive synthetic resin fiber obtained in this manner is, if sufficient for reinforcement of the active material, not sufficient in the conductivity of the fibers themselves in order to enhance the electron conductivity among particles, and still more to mix fibers of 1 to 10 $\mu$m will give rise to reduction of the apparent density of the active material, and therefore the functions of "enhancement of contact between the active material and the grid made of Pb-Ca alloy . . . and prevention of formation of barrier layer" as mentioned herein could not be confirmed.

Meanwhile, to improve the charge acceptability of the negative plate, carbon black is usually added. In this case, the carbon black mainly lowers the end of charging voltage. That is, by decreasing the hydrogen overvoltage of the negative plate, the current in the final stage of charging is increased. Carbon black has a very small particle size as compared with the graphite mentioned above. Therefore, addition of 0.2 wt.% will be a sufficient amount for contacting with individual particles of the active material. However, since the carbon black lacks length, it merely exists among the particles of the active material. In other words, tens or hundreds of active material particles cannot be mutually connected in parallel. The improvement of the charge acceptability of the negative plate by the addition of carbon black is to increase the charging current by lowering the charging voltage, and it does not mean that the current is made easier to flow in the individual particles of the active material. It means that a large current also flows in the positive plate in the final stage of charging, and the corrosion of the positive grid is accelerated by the increase of the overcharge amounts, which cannot be said, therefore, to be a preferable method for the life performance. That is, addition of carbon black to the negative plate does not lead to an essential improvement of charge acceptability.

It is hence a primary object of the invention to solve the problems of the prior art as discussed above by presenting a lead-acid battery which is (1) enhanced in the rate of utilization of active materials of both positive plate and negative plate, possessing higher weight efficiency and volume efficiency than before, (2) improved in the charge acceptability (charge efficiency) of the active materials of both positive plate and negative plate, possessing a long cycle service life performance and a long float service life performance, (3) improved in the resistance to sulfation, capable of using the sulfuric acid of higher concentration, and greatly raised in the rate of utilization without sacrificing the life, (4) notably saved in the electric quantity required for formation of the positive plate, and (5) inexpensive.

SUMMARY OF THE INVENTION

The invention presents a lead-acid battery comprising a positive plate composed of a current collector containing pure lead or lead alloy, and a positive active material mainly made of lead dioxide closely contacting therewith, and a negative plate composed of a current collector containing pure lead or lead alloy, and a negative active material mainly made of metal lead in sponge form closely contacting therewith, in which whiskers possessing electronic conductivity are disposed at least in one active material of the active materials of the positive plate and negative plate, and the active material particles and/or active material particles and current collectors are electronic conductively connected.

As the whiskers to be used, carbon whiskers, graphite whiskers, and titanate whiskers are suitable. The content of addition is preferably 0.01 to 10 wt.% of the weight of the active material, or more preferably 0.01 to 2 wt.%, and the diameter of the whiskers should be 10 μm or smaller; or more preferably 0.0 to 1.0 μm, and the ratio of diameter (D) and length (L) (L/D), that is, the aspect ratio should be 50 or more, or more preferably 100 to 1,000.

The details of the invention are further described below while referring to some of the embodiments.

BRIEF DESCRIPTION OF THE DRAWINGS

FIGS. 1A and 2B are photographs scanning SEM showing the shape of carbon whiskers used in a lead-acid battery of the invention;

DETAILED DESCRIPTION OF THE PREFERRED EMBODIMENTS

Example 1

Figure 1A:
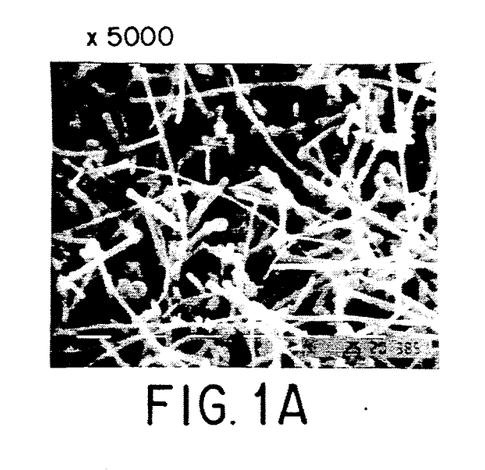
Figure 1B:
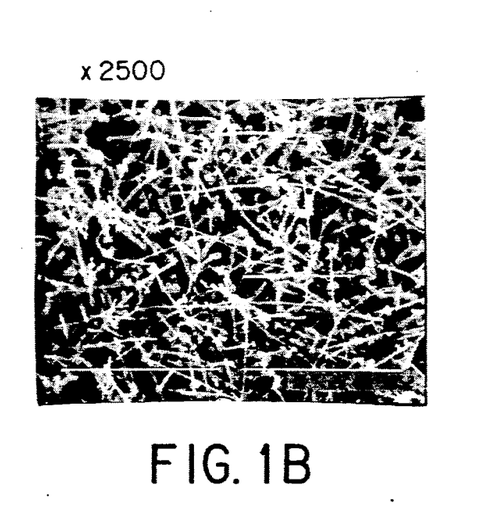

In 940 g of water, 60 g of carbon whiskers were uniformly dispersed by a superhigh speed mixer. The carbon whiskers used in this embodiment were made of hydrocarbon, and manufactured by the vapor deposition growth method. As shown in the SEM in FIG. 1A and 1B, the diameter was about 0.05 to 0.8 μm, and the length was about 10 to 100 μm, and the aspect ratio was about 100, so that the length was relatively long for the very small diameter. The density was 1.96 g/cm$^3$, the electronic conductivity was $7 \times 10^{-4}$ ohm-cm, and the specific surface area by the BET method was 10 to 40 m$^2$/g.

To 170 g of thus prepared carbon whisker disperse solution, 1,000 g of lead oxide powder containing about 30 wt.% of metal lead was added and kneaded, and 75 cc of sulfuric acid at specific gravity of 1.40 was gradually dropped while continuing to knead, and a paste A for the positive plate was obtained.

The same operation was conducted except for addition of specified amounts of lignin and barium sulfate to the carbon whisker disperse solution, and a paste B for the negative plate was obtained. Also, by the same operations as the above except that carbon whiskers were not added, conventional paste C for the positive plate and paste D for the negative plate were obtained Cast grids measuring 38 W by 67 L by 3.3 (2.0) T in mm made of Pb-Ca-Sn alloy free from antimony were pasted with the above pastes by the conventional method (the figure in parentheses refers to the dimension of the grid for the negative plate).

The pasted plates were hydroset at 35° C., 100% RH for 3 days. Then, by drying at 50° C. for 1 day, unformed positive plates A, C, and negative plates B, D were obtained.

Properties of the paste, and weight of the unformed active materials after drying were as shown in Table 1.

TABLE 1

| | | Paste | | After drying |
|---|---|---|---|---|
| | | Apparent density (g/cm$^2$) | Pasted weight (g/plate) | Unformed active material (g/plate) |
| This | Positive plate | 3.73 | 26.2 | 23.9 |

TABLE 1-continued

|  |  | Paste | | After drying |
|---|---|---|---|---|
|  |  | Apparent density (g/cm$^2$) | Pasted weight (g/plate) | Unformed active material (g/plate) |
| invention | A Negative plate B | 3.72 | 16.5 | 15.1 |
| Prior art | Positive plate C | 4.02 | 28.3 | 25.2 |
|  | Negative plate D | 4.02 | 17.8 | 15.9 |

Figure 2:
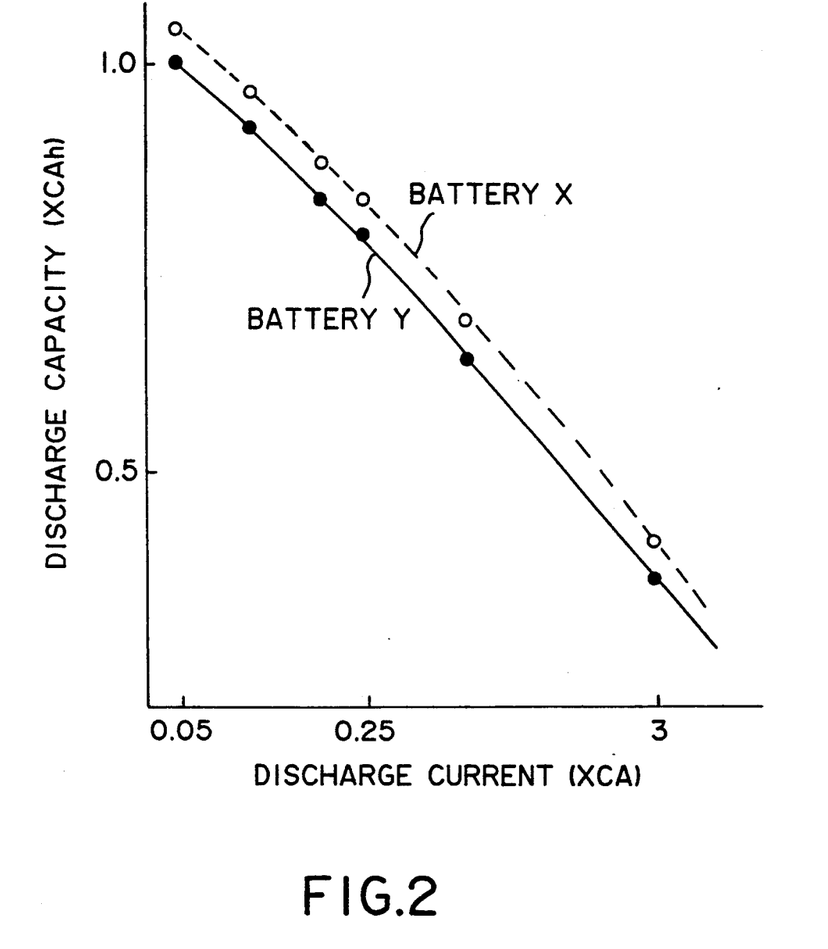
FIG. 2 is a diagram comparatively showing the relation of the capacity and discharge current between the lead-acid battery of the invention and a conventional product.
Figure 3:
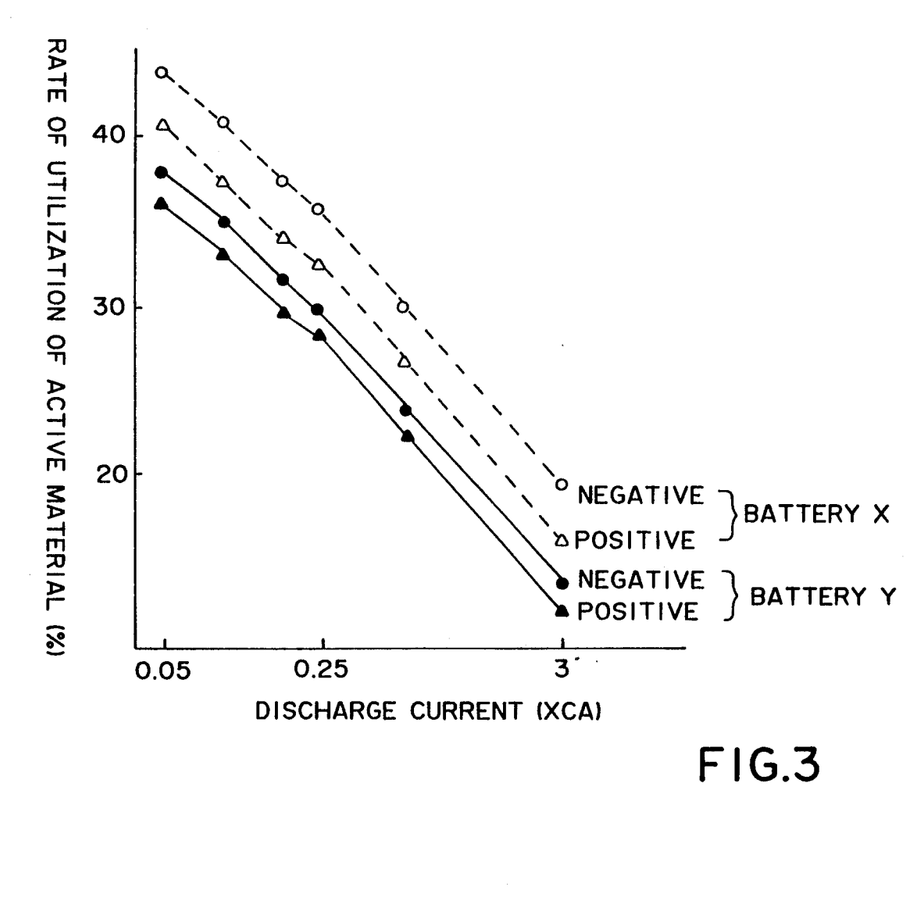
FIG. 3 is a diagram converting the capacity in FIG. 2 into the utilization of active material.

The positive plates A and three negative plates B were stacked by using fine glass separators disclosed in Japanese Patent No. 1272702 to compose a plate group, and it was put into a battery container to fabricate a sealed lead-acid battery X of this invention, while a conventional sealed lead-acid battery Y was prepared in the same manner by using plates C and D. It was filled with 45 cc of $H_2SO_4$ per cell, and a safety vent valve was provided. Afterwards, by container formation about 30 hours at a constant current of 0.8A, batteries X and Y were obtained. The results of investigation of the capacity of these batteries at various discharge currents (0.05 to 3 C) are shown in FIG. 2. The results of calculating the rate of utilization of active material in the same conditions from these results are shown in FIG. 3.

Example 2

Combining the negative plate B and positive plate C obtained in Example 1, a sealed lead-acid battery 2X of the present invention by the same method, and a battery 3X with a specific gravity of 1.350 d at the end of formation were obtained. The 20 HR capacity, and the calculated weight efficiency and volume efficiency of these batteries 2X, 3X and conventional battery Y are as shown in Table 2.

TABLE 2

|  | Type | Positive plate | Negative plate | Electrolyte sp. gr. | 20 HR capa. (Ah) | Weight eff. (WH/kg) | Volume eff. (WH/l) |
|---|---|---|---|---|---|---|---|
| This invention | Battery 2X | C | B | 1.300 | 4.10 | 29.4 | 74.9 |
|  | Battery 3X | C | B | 1.350 | 4.67 | 33.5 | 85.3 |
| Prior art | Battery Y | C | D | 1.300 | 4.00 | 28.2 | 73.1 |

Figure 4:
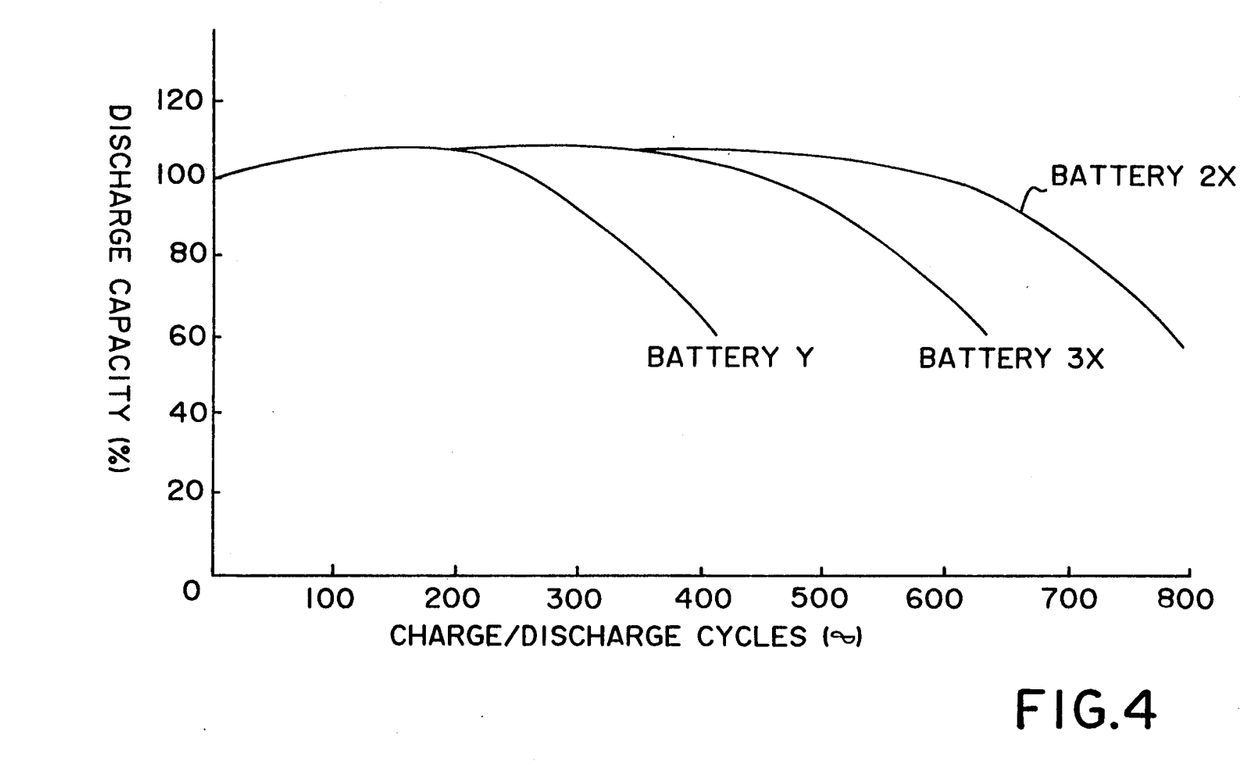
FIG. 4 is a diagram comparing the life performance between the lead-acid battery of the invention and a conventional product.

The results of cycle service life test of these batteries are shown in FIG. 4.
The test conditions are as follows;

Discharge: 0.25C × 2 hrs.
Charge: 0.1C × 6 hrs.
} 3 cycles/day, temp. 25° C.

In every 50 cycles, the capacity test was conducted at a current of 0.25C. The cutoff voltage was 1.700 V/cell.

Example 3

An unfilled tubular plate having a glass fiber woven tube inserted into a spine made of Pb-3% Sb alloy was filled with lead oxide powder containing graphite whisker by 0 (not added, prior art), 0.5, 1.0, 1.5, 3.0, and 5.0 wt.% of the positive active material, and unformed tubular type positive plates were fabricated.

One unformed positive plate and two conventional negative plates were combined, and put into a container. In a sulfuric acid solution at a specific gravity of 1.10, formation was conducted at a current density of 1 A/dm$^2$ per positive plate. The plate was taken out at specific time intervals, and 2 discharge test was conducted to see the ease of formation of the positive plate, and the results as shown in FIG. 5 were obtained.

Figure 5:
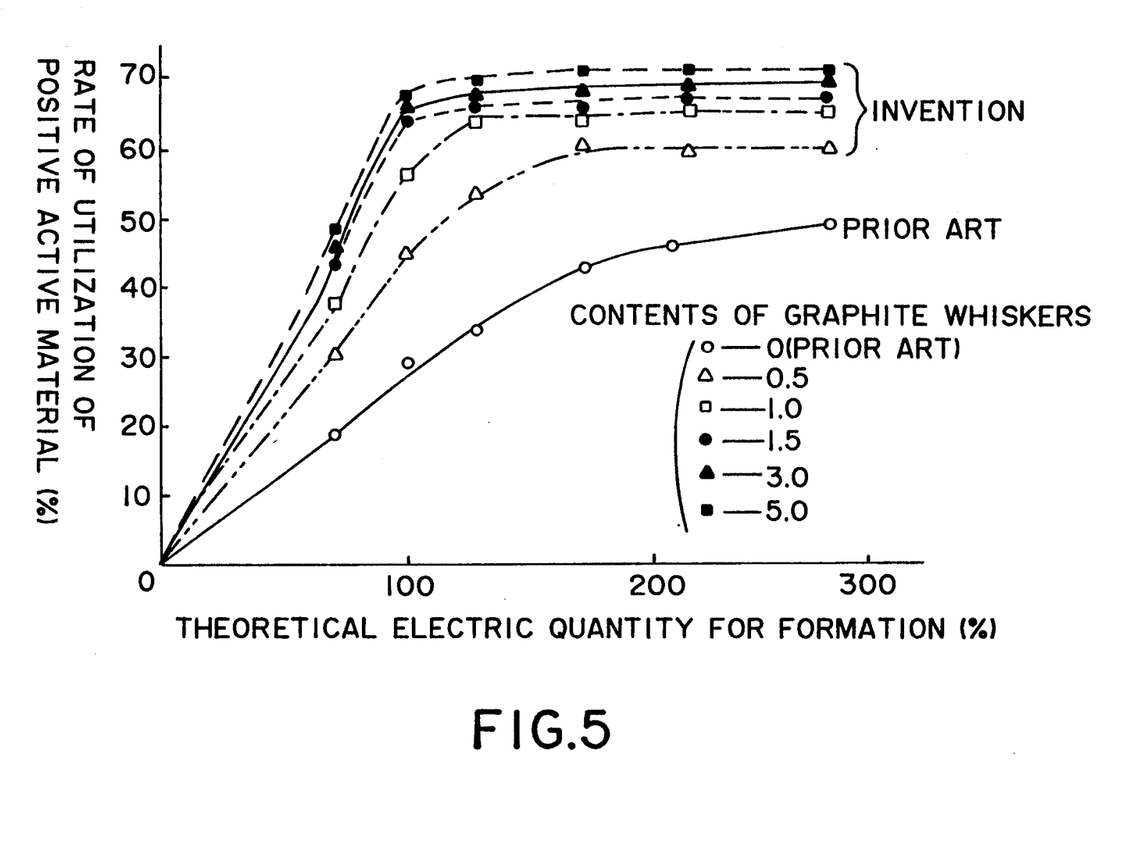
FIG. 5 is a diagram comparing the ease of formation between the lead-acid battery of the invention and a conventional product.

In FIG. 5, the axis of abscissas denotes the percentage of the theoretical formation electric quantity calculated from the weight of the unformed active material. That is, 100% shows the minimum limit of electric quantity necessary for formation

Example 4

A conventional negative plate E was prepared by adding 0.3 wt.% of carbon black to the negative active material of Example 1. The specific surface area of this carbon black was 1,500 m$^2$/g. Combining this negative plate E and positive plate C, a conventional sealed lead-acid battery Z was obtained.

Figure 6:
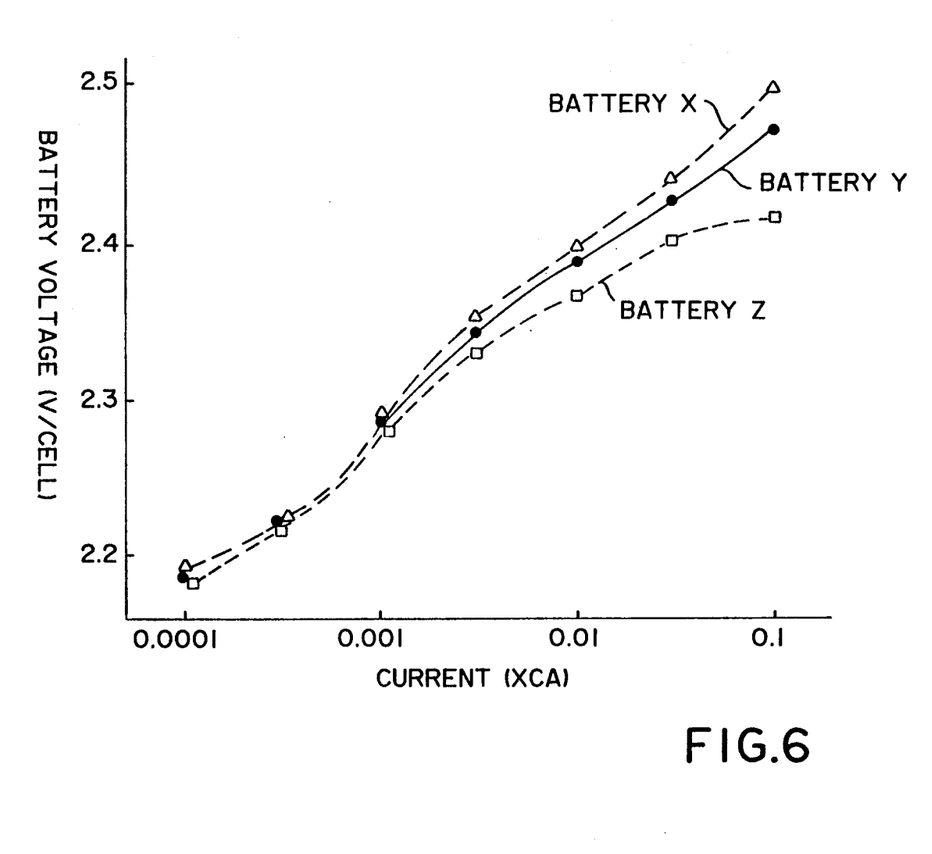
FIG. 6 is a diagram comparing the relation of charging current and battery voltage between the lead-acid battery of the invention and a conventional product.

Using the sealed lead-acid battery X of this invention, and conventional sealed lead-acid batteries Y and Z, the relation between charging current and terminal voltage was studied by charging with a constant current of 0.0001 to 0.5 CA, of which result is shown in FIG. 6.

Example 5

Adding graphite whiskers and potassium titanate whiskers by 1 wt.% of the active material, unformed positive and negative plates F, G, and H, I of the invention were obtained. The graphite whiskers are prepared by heating carbon whiskers at 3000° C., and the size is hardly changed, but the electronic conductivity is $5 \times 10^{-5}$ ohm-cm, being one digit higher than that of carbon whiskers. The potassium titanate whiskers are of "Dentol BK-300 (trade name)" (made by Otsuka Chemical Co.,), measuring 0.2 to 0.5 μm in diameter and 10 to 20 μm in length, and the electronic conductivity is $1 \times 10^{-1}$ ohm-cm, not so high as that of carbon whiskers.

The grid is made of Pb-1.5% Sb alloy, measuring 108 W by 110 L by 1.7 (1.1) T in mm (the figure in parentheses is the thickness of the negative grid). The obtained unformed plates were stacked by way of interposing a porous polyethylene separator between them, and inserted into the container, which was adhered with a lid and filled with electrolyte and kept stand. By container forming passing 120% of the theoretical formation electric quantity calculated from the weight of the positive active material, a 28 Ah/5 HR. lead-acid battery for automobile was obtained. The remaining whisker quantity in the positive plate after formation of the batteries, capacities, and charge acceptance according to JIS D 5301 were investigated, and the results are shown in Table 3. In the test of charge acceptance, the current at the 10th minute of the present invention is smaller than that of the conventional example, which is because the quantity of electricity flowing in the first 10 minutes at the initial stage is larger than that of the conventional example.

The electrolyte of high specific gravity means an electrolyte small on the content of $H_2O$ which is not related to the charge and discharge reaction, and whether of sealed or not, it is possible to greatly im-

TABLE 3

|  | Positive plate | Negative plate | Whiskers | Residual[*2] whisker amount (%) | Capacity after formation (Ah/5 hrs) | Capacity after 5 ∞ (Ah/5 hrs) | Charge acceptance (A) |
|---|---|---|---|---|---|---|---|
| This invention | F | G | Graphite | 60 | 28.5 | 30.2 | 2.82 |
|  | H | I | Potassium titanate | 95 | 27.6 | 29.5 | 4.05 |
| Prior art | — | — | None | — | 20.3[*1] | 28.5 | 5.27 |

[*1] Capacity at the same formation electric quantity as in this invention.

[*2] $\dfrac{\text{(Amount of whiskers contained in active material after formation)}}{\text{(Amount of whiskers in unformed active material)}} \times 100(\%)$ It is evident from Example 1 that the lead-acid battery of the present invention is high in the rate of utilization of active material, and possesses high weight efficiency and volume efficiency. The number of particles of positive active material per unit volume is $1 \times 10^{12}$ to $1 \times 10^{16}$, and it is estimated around $1 \times 10^9$ to $1 \times 10^{13}$ in the negative plate, as mentioned earlier. As shown in Example 1, when added by about 1 wt.% to the active material, the number of whiskers is estimated to be $1 \times 10^{10}$ to $1 \times 10^{13}$ per unit volume. Above all, since the aspect ratio of whiskers is great, the number of particles of the active material contacting with one whisker is estimated to be around 50 to 1,000. Accordingly, in the negative plate, for example, it is estimated that plural carbon whiskers are contacting with one particle of the active material. Conventionally, particles were separate from each other, not bonded electronic conductively, while they are connected parallel in this invention. Therefore, not only in charging and discharging, but also in the formation process, the current is extremely easy to flow, and a higher charge acceptability, a greater discharge capacity, and an extremely high formation efficiency will be obtained. This is obvious from the illustrations in Examples 1, 3 and 5.

The negative active material becomes a hardly reducible, coarse crystalline sulfate due to the electrolyte at high concentration, and charging and discharging at high temperature, and is lowered in its capacity.

On the other hand, even in the sealed lead-acid battery reduced in the volume of electrolyte, as well as flooded lead-acid battery, the concentration becomes high in the lower part of the cell and low in the upper part due to repetition of deep discharge, that is, stratification occurs.

The lower part of the negative plate is usually remote from the lug, and the sulfuric acid at high concentration is high in resistance and low in solubility of lead sulfate. Therefore, the generated stratification causes the lower part of negative plate to be sulfated. According to this invention, however, since the resistance in the plate is low, a sufficient current flows even in the lower part of the negative plate in spite of the long distance from the lug, and the problem of shortening of life of the battery by the sulfation of the negative plate can be solved. This is evident from Example 2.

The conventional sealed type lead-acid battery Y is short in life due to sulfation in the lower part of the negative plate, while the sealed lead-acid battery 2× and the battery 3× using $H_2SO_4$ electrolyte of high specific gravity of 1.350 d according to the this invention presented an extremly excellent life performance.

prove the weight efficiency and volume efficiency of the battery. In the conventional lead-acid battery, since the sulfation resistance to the electrolyte of high specific gravity of the negative plate was poor, use of electrolyte of high specific gravity meant shortening of the battery life.

According to the present invention, without sacrificing the life, it is possible to obtain a lead-acid battery with a high weight and volume efficiency, which is evident from Example 2.

Meanwhile, the unformed active material is lead sulfate (tribasic or tetrabasic) or lead oxide (when filled), and these materials lack electronic conductivity.

Therefore, when forming such material, formation is promoted sequentially from the particles contacting with the grid or spine used as the current collector. That is, remote active material particles not contacting with the current collector will not be formed until supplied with electrons by way of the particles intervening between these remote particles and the current collector. Accordingly, hitherto, especially in the positive plate, it took a long time and a large quantity of electricity for formation, requiring about 2 to 4 times as much as the formation electric quantity theoretically needed. By contrast, in the present invention, even particles remote from the current collector are bonded with the current collector by way of electronic conductive whiskers, so that the active material particles are formed as soon as formation begins. Hence, the efficiency of formation is extremely high, and even in the case of tubular type battery, mixing of minium or the like is not needed, and it is enough to use within 2 times the theoretically required formation electric quantity, or even 1.1 times depending on the condition. At the same time, the formation time and electric quantity may be reduced to $\frac{1}{2}$ to $\frac{1}{4}$ of the conventional example, and lead-acid batteries of high productivity and extremely low cost will be realized, which is evident from Example 3.

Conventionally, in order to improve the charge acceptability of the negative plate, carbon black was added. It is effective to increase the charging electric quantity by lowering the hydrogen overvoltage of the negative plate and increasing the current flowing in the final stage of charging. It, however, means at the same time that the overcharged electric quantity is large in practice. This is far from preferable because it leads to decrease of electrolyte level because of electrolysis of water, increase of frequency of topping up, and acceleration of corrosion of the positive grid.

This is derived from the fact that the electron conduction between the current collector and the active material particles remote from it depends only on the reduced active material particles and carbon black particles intervening between them. In this invention, simultaneously with start of charging, the active material particles remote from the current collector begin to be charged, and the charging efficiency is very high. What is more characteristic is that the carbon whiskers and graphite whiskers do not lower the hydrogen overvoltage of the negative plate as shown in Example 4. It means, as shown in Example 5, the charge acceptance in the initial stage of charging is excellent, and that the charging current flowing in the battery in the final stage of charging is smaller than that in the prior art. Thus, it has overcome the demerits of increase of frequency of topping up and acceleration of corrosion of positive grid as experienced conventionally by adding carbon black. Incidentally, the excellent charge acceptability means the high resistance to sulfation mentioned above.

Accordingly, it is evident that the lead-acid battery of this invention has a longer life than the conventional one if used in floating application. It may be easily understood from Examples 2 and 4.

The whiskers used in this invention are, therefore, intended to encourage the flow of electrons into the active material particles remote from the current collector. For this purpose, the whiskers themselves are desired to have a high electronic conductivity, be longer in size, and greater in number. The electronic conductivity should be $1 \times 10^{-1}$ ohm-cm or more, or more preferably $1 \times 10^{-3}$ ohm-cm or more. What is more important is to connect as many active material particles as possible electronic conductively without extremely decreasing the amount of active material. Accordingly, they must be short fibers, having a small diameter and a long length, as far as possible. Considering from the active material particles existing per unit volume mentioned above, those having a diameter of 30 $\mu$m or more cannot be used because the number existing per unit volume is too small. Therefore, the diameter must be smaller than 10 $\mu$m, or more preferably smaller than 1 $\mu$m, and the aspect ratio must be 50 or more. Most preferably, the whiskers should have a diameter of 0.01 to 1.0 $\mu$m, and an aspect ratio of 100 to 1,000.

As the materials for whiskers, aside from carbon, graphite and potassium titanate shown in the foregoing embodiments, other whiskers possessing electronic conductivity and not harmful for the lead-acid battery may be used.

When whiskers are used in the positive plate, not only carbon but also graphite heat treated at high temperature and having an excellent resistance to oxidation is oxidized, and it is forced out of the active material physically by oxygen gas, and nearly half is lost during the formation process. Therefore, when the lead-acid battery of this invention is assembled by using formed plates, the amount of whiskers existing in the positive plate is smaller than the amount initially mixed into the active material. If the effect of whiskers is expected not only in the formation process but also in the subsequent steps, the rate of adding initially to the active material must be high. It may be somewhat lower if the effect is expected only in the formation process.

In the former case, the whisker amount with respect to the unformed positive active material is 1 to 10 wt %, or preferably 1 to 5 wt.%, and in the latter case, the amount should be 0.01 to 3 wt.%, or preferably 0.01 to 2.0 wt.%.

In the case of the negative plate, carbon or graphite whiskers will not be lost. The effect is maintained throughout the whole life of the battery, and hence formation is easier as compared with the positive plate. Hence, the amount of whiskers should be determined on the basis of the expected effect and economy.

The content of carbon whiskers or graphite whisters to the negative active material should be 0.01 to 3 wt.%, or preferably 0.01 to 2.0 wt.%.

Another important point for exhibiting the effect of whiskers to the maximum extent is to disperse uniformly in order to achieve a sufficient contact between the whiskers and the active material particles. For this purpose, without directly mixing into the lead powder material, as shown in Example 1, it is better to disperse preliminarily in water by using superhigh speed mixer. In order to improve dispersion in water, in the case of carbon or graphite whiskers, it is enough to treat with surface active agent or directly provide the surface with hydrophilic groups in vapor phase. With such treatment, uniform dispersion is attained without using superhigh speed mixer.

Another point that must be taken into consideration for using whiskers is to keep appropriate the density of active material. When the positive grid is made of pure lead, calcium alloy, or lead alloy free from antimony, if the apparent density of the active material is small, the diffusion of the electrolyte is too smooth, and the corrosion layer of the grid surface is discharged before the active material is completely discharged, and it becomes a lead sulfate, which is an insulating material. It prevents the electronic conduction between the active material and grid, so that the nominal capacity may not be attained.

To prevent this, when using carbon whiskers, for example, by using a mixed paste of sodium metaphosphate, sodium pyrophosphate, or other metaphosphoric or pyrophosphoric alkali metal salts, an active material high in density is obtained if the amount of whiskers to the active material is high, and it is very convenient. Such phosphoric alkali metal salt transforms the corrosion layer on the surface of the grid, and this corrosion layer is not changed into a form to insulate between the grid and active material, so that the discharge can be maintained, which is more convenient.

The quantity of the negative active material determines the high rate discharge capacity. In the case of using nonmetallic whiskers in the negative plate, a lead-acid battery having superior high rate discharge characteristic will be obtained by raising the density by mixing such pyrophosphoric or metaphosphoric alkali metal salt into the paste.

A proper addition rate of such pyrophosphoric or metaphosphoric alkali metal salt to the active material varies with the quantities of sulfuric acid and water used for preparing the paste. Anyway, to obtain an appropriate positive paste density of 3.7 to 4.5 g/cm$^3$ and negative paste density of 3.5 to 4.5 g/cm$^3$ of a conventional pasted plate, the whisker amount with respect to the active material must be 0.001 to 5 wt.%. By defining the amount in this range, the positive active material apparent density of 3.3 to 4.0 g/cm$^3$ and the negative active material apparent density of 3.1 to 4.0 capable of satisfying sufficiently both the life performance and high rate discharge performance will be obtained. If less than 0.001 wt.%, the apparent density of the paste cannot be raised, and if more than 5 wt.%, the self-discharge rate of the obtained battery is too high to be preferable.

When the conventional carbon fiber with diameter of, for example, 7 to 20 μm was mixed into the active material, the apparent density of the active material was lowered as mentioned above, and the life became shorter. Such problem is avoided by using whiskers of the invention. Actually, when added by about 1 wt.% to the positive active material of which apparent density without addition was 4.02, the apparent density was lowered to 2.6 in the case of carbon fiber, while it was lowered only to 3.73 in the case of whiskers.

Moreover, the number of carbon fibers existing per 1 cm$^3$ of apparent volume of the active material in this case is about $2 \times 10^6$, and the total surface area is about 80 cm$^2$, and in the case of carbon whiskers, the corresponding values are greater by far, that is, about $1 \times 10^{11}$ and 4900 cm$^2$, respectively. This is very preferable, and it is desired to have $1 \times 10^9$ pieces or more per 1 cm$^3$ of active material. Therefore, if carbon fibers with large diameter are used, not only the contact pressure of the active material but also the contacting area and number of fibers are extremely small as compared with those of whiskers.

It is thus known that when carbon fibers with diameter of 7 to 20 μm are used, in order to exhibit their effect to the maximum extent, it is necessary to keep tight contact between as many active material particles and carbon fibers as possible by raising the density of the active material.

In order to contain carbon fibers while maintaining a high active material density, addition of metaphosphoric alkali metal salt and/or pyrophosphoric alkali metal salt is extremely effective, and unless using it, the effect of mixing carbon fibers is not exhibited fully. When mixing carbon fibers, unless the apparent density of the active material is 3.0 or more or preferably 3.1 to 4.0 in the negative plate, and 3.3 or more or preferably 3.3 to 4.5 in the positive plate, problems of sulfation of the negative plate and discharge of the corrosion layer of the positive grid occur, which may lead to shortening of the life. To achieve this while keeping the adhesion to the grid, however, it is necessary to have a coexistence of metaphosphoric alkali metal salt or pyrophosphoric alkali metal salt by 0.001 to 5 wt.%. This is applied, also when the diameter of whiskers is as large as 7 to 10 μm. That is, in the case of whiskers, if the content is not more than about 1 wt.%, a sufficiently high active material density will be obtained even in the absence of metaphosphoric alkali metal salt and/or pyrophosphoric alkali metal salt. When the content is increased, however, or in the case of whiskers having diameters exceeding 1 μm, such as 5 to 10 μm, it is indispensable to have the coexistence of metaphosphoric alkali metal salt and/or pyrophosphoric alkali metal salt. From the viewpoint of such contact density, it is desired that the whiskers possess a specific surface area of 2 m$^2$/g or more, or more preferably 10 to 40 m$^2$/g.

The lead-acid batteries may be roughly classified into three types by the shape of the plates.

The first is the pasted type plate having the grid of pure lead or lead alloy obtained by casting, expanding or brading method filled with paste of active material. The second is the tubular type plate, as shown in Example 3, fabricated by inserting a cylindrically braided tube of fibers such as glass fibers and polyester fibers into a spine made of pure lead or lead alloy, and filling the tube with active material.

The third is the plante plate for obtaining the current collector and active material by electrolyzing the plate of pure lead. The tubular type plate is exclusively used for the positive plate, and the negative plate as the counter electrode is usually a pasted type plate. This invention, however, is not intended to limit the type of the plate, and it may be applied to the paste type positive plate and negative, and tubular type plate, but not to the plante type plate, and effects have been confirmed in these applicable types.

Incidentally, in order to charge the lead-acid battery completely, it is necessary to charge usually about 105 to 120% of discharged electric quantity. By this overcharge, the water in the electrolyte is electrolyzed, and the electrolyte is lost, and it is necessary to top up periodically. In order to decrease or completely eliminate this topping up, the current collector is made of a calcium alloy without containing antimony, or the volume of electrolyte is reduced, and it is absorbed and kept in a fine porous material. Or by gelling with silicon dioxide, high absorbing macromolecules, or the like, it is sealed by recombining the negative active material with the oxygen gas generated at the positive plate in the final stage of charging. This invention may be applied to any one of these lead-acid batteries.

As stated herein, the lead-acid battery of the invention is:

Capable of raising the utilization of positive and negative active materials, possessing higher weight efficiency and volume efficiency than before, Improved in the charge acceptability (charge efficiency) of the positive and negative active materials, possessing long service life cycle and float life performance, Improved in the resistance to sulfation of the negative active material, capable of using the sulfuric acid of higher concentration, and greatly enhanced in the rate of utilization without sacrifice of the life, and Greatly reduced in the electric quantity required for formation of the positive plate, and low in cost, so that its industrial values are extremely great.

What is claimed is:

1. A lead-acid battery using dilute sulfuric acid as the electrolyte, having a plate group composed of at least one positive plate, one negative plate and an intervening separator, wherein Whiskers of at least one type selected from carbon, graphite and potassium titanate, having an electronic conductivity, with a diameter of 10 μm or less and an aspect ratio of 50 or more, and a specific surface area of at least 2 m$^2$/g are mixed with at least one of the active materials of the positive and negative plates by 0.01 to 10 wt.% of the active material so as to connect the active material particles mutually and/or active material and current collector electronic conductively.

2. A lead-acid battery of claim 1, wherein the diameter of whiskers is 0.01 to 1.0 μm.

3. A lead-acid battery of claim 1, wherein the aspect ratio of whiskers is 100 to 1,000.

4. A lead-acid battery of claim 1, wherein the specific surface area of whiskers is 10 to 40 m$^2$/g.

5. A lead-acid battery of claim 1, wherein the amount of whiskers to the active material is 0.01 to 2 wt.%.

6. A lead-acid battery of claim 1, wherein the apparent density of the positive active material is 3.3 to 4.5 g/cm$^3$, and that of the negative active material is 3.1 to 4.0 g/cm$^3$.

7. A lead-acid battery of claim 1, wherein the whiskers are made of carbon and/or graphite, the diameter is 0.01 to 1.0 μm, the aspect ratio is 100 to 1,000 the specific surface area is 10 to 40 $m^2/g$, the amount of whiskers to the active material is 0.01 to 2.0 wt.%, and there are $10^9$ or more whiskers per 1 $cm^3$ of the apparent volume of the active material.

8. A lead-acid battery of claim 7, wherein the apparent density of the positive active material is 3.3 to 4.5 $g/cm^3$, and that of the negative active material is 3.1 to 4.0 $g/cm^3$.

9. A sealed lead-acid battery in which whiskers of carbon and/or graphite having an electronic conductivity with a diameter of 10 μm or less, aspect ratio of 50 or more and specific surface area of at least 2 $m^2/g$ are mixed at an amount of 0.01 to 10 wt.% to at least one of the active materials of the positive and negative plates, the grid of the negative plate is made of pure lead or a lead alloy substantially free from antimony, the whiskers are electronic conductively connecting the active material particles mutually, and the active material and the grid, and the positive and negative plates are isolated by a separator, the electrolyte is absorbed and held in fine pores of the separator having a high liquid absorbing property and fine pores of the positive and negative active materials so as not to be fluidized, or is gelled firmly so as not to be fluidized by silicon dioxide, and generation of hydrogen gas from the negative plate is inhibited by the reaction of the negative active material and oxygen generated in the positive plate in their final stage of charging.

10. A sealed lead-acid battery of claim 9, wherein the whisker diameter is 0.01 to 1.0 μm.

11. A sealed lead-acid battery of claim 9, wherein the whisker aspect ratio is 100 to 1,000.

12. A sealed lead-acid battery of claim 9, wherein the whisker specific surface area is 10 to 40 $m^2/g$.

13. A sealed lead-acid battery of claim 9, wherein the amount of whiskers to the active material is 0.01 to 2.0 wt.%.

14. A sealed lead-acid battery of claim 9, wherein the apparent density of the positive active material is 3.3 to b 4.5 $g/cm^3$, and that of the negative active material is 3.1 to 4.0 $g/cm^3$.

15. A sealed lead-acid battery of claim 9, wherein the whiskers do not lower the hydrogen overvoltage of the negative.

16. A sealed lead-acid battery of claim 9, wherein there are $10^9$ or more whiskers per 1 $cm^3$ of apparent volume of the active material.

17. A sealed lead-acid battery of claim 9, wherein the whiskers are 0.01 to 1.0 μm in diameter, 100 to 1,000 in aspect ratio, and 10 to 40 $m^2/g$ in specific surface area, and the apparent density of the positive active material is 3.3 to 4.5 $g/cm^3$, and that of the negative active material is 3.1 to 4.0 $g/cm^3$.

18. A sealed lead-acid battery, in which a negative grid is made of pure lead or an antimony-free lead alloy substnatially not lowering the hydrogen overvoltage, whiskers of carbon and/or graphite having an electronic conductivity, and not lowering the hydrogen overvoltage, with a diameter of 0.01 to 1.0 μm, aspect ratio of 50 or more and specific surface area of 2 $m^2/$ or more are mixed to the negative active material at an amount based on 0.01 to 2.0 wt.% of the active material and the whiskers are electronic conductively connecting the active material particles mutually, and the active material particles and the negative grid, and an element is composed of at least a negative plate, a positive plate substantially free from antimony, and a separator of a high electrolyte absorbing property mainly made of small glass fibers with the diameter of 1 μm or less by staking together, a dilute sulfuric acid electrolyte is present in a limited quantity free from fluidity within fine pores in the positive and negative active materials and fine pores in the separator, and generation of hydrogen gas from the negative plate is inhibited by the reaction between the negative active material and oxygen gas generated at the positive plate in the final stage of charging.

19. A sealed lead-acid battery of claim 18, wherein the apparent density of the negative active material is 3.1 to 4.0 $g/cm^3$.

20. A sealed lead-acid battery of claim 18, wherein the specific gravity of the dilute sulfuric acid electrolyte is higher than 1.350 d.

21. A sealed lead-acid battery, in which a negative grid is made of pure lead or an antimony-free lead alloy substantially not lowering the hydrogen overvoltage, whiskers of carbon and/or graphite having an electronic conductivity, and not lowering the hydrogen overvoltage, with a diameter of 0.01 to 1.0 μm, aspect ratio of 50 or more and specific surface area of 2 $m^2/g$ or more are mixed to the negative active material at an amount 0.01 to 2.0 wt.% and the whiskers are electronic conductively connecting the active material particles mutually, and active material particles and the negative grid, and a plate group is composed of the negative plate, and at least one positive plate consisting of a positive grid made of pure lead or a lead alloy substantially free from antiomony, a positive grid made of pure lead or lead alloy and lead dioxide active material comprising a dispersant of pyrophoshoric and/or metaphosphoric alkali metal salt, which are stacked by means of interposing a separator between them, a dilute sulfuric acid electrolyte is present in a limited quantity so as not to be fluidized in fine pores in the positive and negative active materials, and in the fine pores of the high absorbing separator, or is gelled and immobilized by fine powder of silicon dioxide, and generation of hydrogen gas from the negative plate is suppressed by the reaction of the negative active material with oxygen gas generated in the positive in the final stage of charging.

22. A sealed lead-acid battery of claim 21, wherein the dispersant is sodium pyrophosphate.

23. A sealed lead-acid battery of claim 21, wherein the dispersant is sodium metaphosphate.

24. A sealed lead-acid battery of claim 2I, wherein the dispersant is sodium pyrophosphate, and is present at an amount based on 0.001 to 5 wt.% of the positive active material.

25. A sealed lead-acid battery of claim 21, wherein the dispersant is sodium metaphosphate, and is present at an amount of 0.001 to 5 wt.% based on the positive active material.

26. A sealed lead-acid battery of claim 21, wherein the whiskers are 0.01 to 1.0 μm in diameter, 100 to 1,000 in aspect ratio, and 10 to 40 mhu 2/g in specific surface area, being present at an amount of 0.01 to 2.0 wt.% of the negative active material, while sodium pyrophosphate is present in the positive active material at an amount of 0.001 to 5 wt.%.

27. The lead-acid battery of claim 5, wherein the amount of whiskers based on the active material is 0.01 to 1.0 wt.%.

28. The lead-acid battery of claim 7, wherein the amount of whiskers based on the active material is 0.01 to 1.0 wt.%.

29. The sealed lead-acid battery of claim 13, wherein the amount of whiskers based on the active material is 0.01 to 1.0 wt.%.

30. The sealed lead-acid battery of claim 18, wherein the amount of whiskers based on the active material is 0.01 to 1.0 wt.%.

31. The sealed lead-acid battery of claim 21, wherein the amount of whiskers based on the active material is 0.01 to 1.0 wt.%.

32. The sealed lead-acid battery of claim 24, wherein the amount of sodium pyrophosphate based on the positive active material is 0.05 to 0.3 wt.%.

33. The sealed lead-acid battery of claim 25, wherein the amount of sodium metaphosphate based on the positive active material is 0.05 to 0.3 wt.%.

* * * * *